US007860197B2

(12) United States Patent
Hur et al.

(10) Patent No.: US 7,860,197 B2
(45) Date of Patent: Dec. 28, 2010

(54) SPECTRUM-SENSING ALGORITHMS AND METHODS

(75) Inventors: Youngsik Hur, Alpharetta, GA (US); Chang-Ho Lee, Marietta, GA (US); Jeongsuk Lee, Kyunggi (KR); Kihong Kim, Kyunggi (KR); Haksun Kim, Daejeon (KR)

(73) Assignee: Samsung Electro-Mechanics (KR)

( * ) Notice: Subject to any disclaimer, the term of this patent is extended or adjusted under 35 U.S.C. 154(b) by 705 days.

(21) Appl. No.: 11/856,472

(22) Filed: Sep. 17, 2007

(65) Prior Publication Data
US 2008/0080604 A1  Apr. 3, 2008

Related U.S. Application Data

(60) Provisional application No. 60/827,597, filed on Sep. 29, 2006.

(51) Int. Cl.
*H04L 27/144* (2006.01)
*H04L 23/00* (2006.01)
*H04B 1/18* (2006.01)
(52) U.S. Cl. ................ 375/344; 375/377; 455/161.1
(58) Field of Classification Search .......... 375/135, 375/147, 224, 295, 296, 344, 377; 455/77, 455/150.1, 154.1, 160.1, 161.1, 161.3, 450–451, 455/452.1, 454–455, 464, 509, 120, 173.1, 455/179.1, 181.1, 182.1, 192.1
See application file for complete search history.

(56) References Cited

U.S. PATENT DOCUMENTS

| 4,501,020 | A | 2/1985 | Wakeman |
| 5,282,227 | A | 1/1994 | Crawford |
| 5,386,495 | A | 1/1995 | Wong et al. |
| 5,552,792 | A | 9/1996 | Smith |
| 5,638,399 | A | 6/1997 | Schuchman et al. |
| 5,784,285 | A | 7/1998 | Tamaki et al. |
| 5,974,042 | A | 10/1999 | Frank et al. |
| 6,219,373 | B1 | 4/2001 | Lee et al. |
| 6,735,238 | B1 | 5/2004 | McCorkle |
| 6,876,864 | B1 | 4/2005 | Chapin |
| 6,912,372 | B2 | 6/2005 | McCorkle et al. |
| 6,928,046 | B1 | 8/2005 | Sajadieh et al. |
| 7,272,265 | B2 | 9/2007 | Kouri et al. |

(Continued)

FOREIGN PATENT DOCUMENTS

DE   19806684 C2   2/1997

(Continued)

OTHER PUBLICATIONS

Zhang et al., An Efficient Multi-Resolution Spectrum Sensing Method for Cognitve Radio, 2008, Third International Conference on Communications and Networking in China, pp. 1226-1229.*

(Continued)

*Primary Examiner*—Tesfaldet Bocure
*Assistant Examiner*—Lawrence B Williams
(74) *Attorney, Agent, or Firm*—Sutherland Asbill & Brennan LLP

(57) ABSTRACT

Spectrum-sensing algorithms and methods may be provided for use in cognitive radios and other applications. The spectrum-sensing algorithms and methods may include receiving an input spectrum having a plurality of channels, performing a coarse scan of the plurality of channels of the input spectrum to determine one or more occupied candidate channels and vacant candidate channels, where the coarse scan is associated with a first resolution bandwidth and a first frequency sweep increment, performing a fine scan of the occupied candidate channels and the vacant candidate channels to determine actually occupied channels and actually vacant channels, where the fine scan is associated with a second resolution bandwidth and a second frequency sweep increment, and storing an indication of the actually occupied channels and the actually vacant channels.

22 Claims, 12 Drawing Sheets

U.S. PATENT DOCUMENTS

| | | |
|---|---|---|
| 7,313,393 B2 | 12/2007 | Chitrapu |
| 7,408,907 B2 | 8/2008 | Diener |
| 7,408,973 B2 | 8/2008 | McCorkle et al. |
| 7,415,080 B2 | 8/2008 | Echavarri et al. |
| 7,483,700 B2 | 1/2009 | Buchwald et al. |
| 7,512,404 B2 | 3/2009 | Morton et al. |
| 7,710,919 B2* | 5/2010 | Woo et al. .................. 370/329 |
| 2002/0065047 A1 | 5/2002 | Moose |
| 2002/0157106 A1* | 10/2002 | Uskali et al. ............... 725/107 |
| 2003/0076165 A1 | 4/2003 | Furman et al. |
| 2003/0161411 A1 | 8/2003 | McCorkle et al. |
| 2003/0198308 A1 | 10/2003 | Hoctor et al. |
| 2003/0224741 A1 | 12/2003 | Sugar et al. |
| 2004/0156445 A1 | 8/2004 | McCorkle |
| 2005/0220228 A1 | 10/2005 | Trachewsky et al. |
| 2006/0084444 A1 | 4/2006 | Kossi et al. |
| 2006/0193372 A1 | 8/2006 | McCorkle et al. |
| 2006/0221918 A1 | 10/2006 | Wang |
| 2006/0233288 A1 | 10/2006 | Gruijters et al. |
| 2006/0250891 A1 | 11/2006 | Krohn |
| 2007/0115878 A1 | 5/2007 | Ashish et al. |
| 2007/0117517 A1 | 5/2007 | Hui et al. |
| 2007/0211669 A1* | 9/2007 | Umatt et al. ................ 370/335 |
| 2008/0057948 A1* | 3/2008 | Mittal et al. ............ 455/426.1 |
| 2008/0247486 A1 | 10/2008 | McCorkle et al. |
| 2008/0291985 A1* | 11/2008 | Adnani et al. .............. 375/220 |
| 2009/0279626 A1* | 11/2009 | Wang ......................... 375/260 |
| 2009/0311982 A1* | 12/2009 | Zhang et al. ............ 455/161.3 |
| 2010/0093360 A1* | 4/2010 | Choi et al. ................. 455/450 |

FOREIGN PATENT DOCUMENTS

| | | |
|---|---|---|
| EP | 0266962 A2 | 10/1987 |
| EP | 0266962 B1 | 5/1988 |
| EP | 0602520 A2 | 12/1993 |
| EP | 0602520 A2 | 6/1994 |
| GB | 2431548 A | 4/2007 |
| GB | 2435567 A | 8/2007 |
| JP | 2003018116 A | 1/2003 |
| JP | 2003018116 A | 3/2007 |
| WO | 03036819 A2 | 5/2003 |
| WO | WO 03036819 A2 | 5/2003 |
| WO | WO 2005081416 A1 | 9/2005 |
| WO | 2007094604 A1 | 8/2007 |

OTHER PUBLICATIONS

Park et al., Implementation Issues of a Wideband Multi-Resolution Spectrum Sensing (MRSS) Technique for Cognitve Radio (CR) Systems, 1st International Conference on Cognitve Radio Oriented Wireless Networks and Communications, 2006, pp. 1-5.*

Hur et al., A Wideband Analog Multi-Resolution Spectrum Sensing (MRSS) Technique for Cognitive Radio (CR) Systems, 2006, IEEE International Symposium on Circuits and Systems, 2006. ISCAS 2006, pp. 4090-4093.*

Laskar, et al., Reconfigurable RFICs and Modules for Cognitive Radio, 2006, Silicon Monolithic Integrated Circuits in RF Systems, 2006, Digest of Papers. 2006 Topical Meeting on, pp. 283-286.*

D. Cabric, et al, Implementation Issues in Spectrum Sensing for Cognitive Radios, Berkeley Wireless Research Center, University of California, Berkeley, IEEE, 2004, pp. 772-776.

S. Haykin, Cognitive Radio: Brain-Empowered Wireless Communications, IEEE Journal on Selected Areas in Communications, vol. 23, No. 2, Feb. 2005, pp. 201-220.

United Kingdom International Search Report for Application No. GB0719063.0 dated Feb. 4, 2008.

Bryan Ackland et al., "High Performance Cognitive Radio Platform with Integrated Physical and Network Layer Capabilities." Interim Technical Report, Jul. 2005, pp. 1-13, Rutgers University.

Blazquez-Fernandez, "Design of synchronization subsystem for an Ultra Wideband Radio." MIT May 2003, this paper can be found in http://dspace.mit.edu/bitstream/handle/1721.1/38447/53225744.pdf?sequence=1 discloses the use of course and fine technologies.

Soo-Young Chang, "Analysis of Proposed Sensing Schemes: IEEE 802.22-06/0032r0," Feb. 2006 this paper can be found in http://mentor.ieee.org/802.22/dcn/06/22-06-0032-00-0000-analysis-sensing-schemes.ppt and discloses different techniques including MRSS of the present application.

D. Cabric et al., "Implementation Issues in Spectrum Sensing for Cognitive Radios." Berkeley Wireless Research Center, University of California, IEEE, 2006, pp. 772-776.

D. Cabric et al., "Physical Layer Design Issues Unique to Cognitive Radio Systems." IEEE 16th International Symposium on Personal, Indoor and Mobile Radio Communications. Sep. 2005: vol. 2, p. 759-763.

Gardner, "Signal Interception: A Unifying Theoretical Framework for Feature Detection," IEEE Trans. on Communication, vol. 36, No. 8, Aug. 1988.

Graps, "An Introduction to Wavelets." IEEE Computational Science and Engineering. vol. 2, No. 2, Jun. 1995. 50-61.

S. Haykin, "Cognitive Radio: Brain-Empowered Wireless Communications." IEEE Journal on Selected Areas in Communications, vol. 23, No. 2, Feb. 2005. 201-220.

Hoctor, "Delay-Hopped Transmitted-Reference RF Communications." 2002 IEEE Convention Conference, pp. 265-269.

Hur, "A Cognitive Radio (CR) Testbed System Employing a Wideband Multi-Resolution Spectrum Sensing (MRSS) Technique." 2006 IEEE 64th Vehicular Technology Conference, 2006, VTC-2006 Fall, Sep. 25-28, 2006 pp. 1-5.

Hur, "A wideband analog multi-resolution spectrum sensing (MRSS) technique for cognitive radio (CR) systems," Proceedings, 2006 IEEE International Symposium on Circuits and Systems, 2006, ISCAS 2006.

Hur, "WLC05-1: A Cognitive Radio (CR) System Employing a Dual-Stage Spectrum Sensing Technique: A Multi-Resolution Spectrum Sensing (MRSS) and a Temporal Signature Detechtion (TSD) Technique," Global Telecommunications Conference, 2006, GLOBECOM '06, IEEE Nov. 27, 2006-Dec. 1, 2006 pp. 1-5.

Kostylev, "Energy Detection of a Signal with Random Amplitude," IEEE International Conference on Communication, vol. 3, p. 1606-1610, Apr. 2002.

Joy Laskar et al., "Reconfigurable RFICs and Modules for Cognitive Radio." SiRF 2006, pp. 283-286.

Mitola, "Cognitive radio for flexible mobile multimedia communications," in Proc. IEEE International Workshop on Mobile Multimedia Communication, Nov. 15, 1999.

Mokhtar Nibouche et al., "Design and Implementation of a Wavelet Based System." IEEE Xplore. Downloaded Mar. 25, 2009. 463-466.

Olivier Rioul et al., "Fast Algorithms for Discrete and Continuous Wavelet Transforms." IEEE Transactions on Information Theory. vol. 38, No. 2. Mar. 1992. 569-586.

Park, "Implementation Issues of a Wideband Multi-Resolution Spectrum Sensing (MRSS) Technique for Cognitive Radio (CR) Systems," 1st International Conference on Cognitive Radio Oriented Wireless Networks and Communications, 2006, Jun. 8-10, 2006. pp. 1-5.

Park, "Analog integrator and analog-to-digital converter effect on a Multi-Resolution Spectrum Sensing (MRSS) for cognitive radio systems," Microwave Conference, 2006, APMC 2006, Asia-Pacific Dec. 12-15, 2006 pp. 971-974.

Salem, "New multiple access gram differential DS-UWB system," 2nd International Conference on Broadband Networks, 2005 BroadNets 2005, Oct. 7-7, 2005 pp. 1163-1167 vol. 2.

Tian, "A Wavelet Approach to Wideband Spectrum Sensing for Cognitive Radios." 2006 <URL: www.ece.mtu.edu/faculty/ztian/papers/crowncom06_wavelet.pdf>.

Tian, "Weighted Energy Detection of Ultra-Wideband Signals." IEEE 6th Workshop on Signal Processing Advances in Wireless Communication. Jun. 2005. 1068-1072.

Types of Radio Emissions, Wikipedia, Dec. 19, 2006 http://en.wikipedia.org/wiki/Types_of_radio_emissions.

Yoon, "Power measurement using the wavelet transform," IEEE Transactions on Instrumentation and Measurement, vol. 47, Issue 5, Oct. 1998 pp. 1205-1210.

Office Action issued on Mar. 25, 2009 for German Patent Application No. 10 2006 048 541.6.
French Search Report dated Sep. 17, 2007.
German Office Action for Application No. 102006048542.3-35 mailed Jun. 10, 2008.
English Translation for German Office Action for Application No. 102006048542.3-35 mailed Jun. 10, 2008.
Notice of Allowance dated Jan. 25, 2010 for U.S. Appl. No. 11/458,249.
Non-Final Office Action dated Jul. 6, 2009 for U.S. Appl. No. 11/458,249.
Notice of Allowance dated Oct. 26, 2009 for U.S. Appl. No. 11/458,275.
Non-Final Office Action dated Jun. 10, 2009 for U.S. Appl. No. 11/458,275.
Non-Final Office Action dated Jun. 17, 2009 for U.S. Appl. No. 11/458,280.
Final Office Action dated Oct. 22, 2009 for U.S. Appl. No. 11/458,280.
Notice of Office Action dated Feb. 10, 2010 from Koran Intellectual Property Office.
Tian, Z., A Wavelet Approach to Wideband Spectrum Sensing for Cognitive Radios, 2006. <URL:www.ece.mtu.edu/faculty/ztian/papers/crowncom06_wavelet.pdf>.

* cited by examiner

SPECTRUM-SENSING ALGORITHMS AND METHODS

RELATED APPLICATION

The present application claims priority to U.S. Provisional Application Ser. No. 60/827,597, filed Sep. 29, 2006, and entitled "Spectrum-Sensing Algorithms and Methods," which is hereby incorporated by reference in its entirety as if fully set forth herein.

FIELD OF INVENTION

The invention relates to cognitive radio applications, and more particularly to spectrum sensing algorithms and other decision methods.

BACKGROUND OF INVENTION

In the United States and in a number of other countries, a regulatory body like the FCC (Federal Communications Commission), oftentimes regulates the use of radio spectrum in order to fulfill the communications needs of entities such as businesses and local and state governments as well as individuals. More specifically, the FCC licenses a number of spectrum segments to entities and individuals for commercial or public use. These licenses may allow these entities and individuals ("licensees") an exclusive right to utilize their respective licensed spectrum segments for a particular geographical area for a certain amount of time. Such licensed spectrum segments are believed to be necessary in order to prevent or mitigate interference from other sources. However, if particular spectrum segments are not in use at a particular location at a particular time ("the available spectrum"), another device should be able to utilize such available spectrum for communications. Such utilization of the available spectrum would make for a much more efficient use of the radio spectrum or portions thereof.

Cognitive Radios (CRs) are seen as a solution to the current low usage or under utilization of the radio spectrum. It is a technology that will enable flexible, efficient and reliable spectrum use by adapting the radio's operating characteristics to the real-time conditions of the environment. CRs have the potential to utilize the large amount of unused spectrum in an intelligent way while not interfering with other incumbent devices in frequency bands already licensed for specific uses. CRs are enabled by the rapid and significant advancements in radio technologies (e.g., software-defined radios, frequency agility, power control, etc.), and can be characterized by the utilization of disruptive techniques such as wide-band spectrum sensing, real-time spectrum allocation and acquisition, and real-time measurement dissemination.

Accordingly, there is a need in the industry for spectrum sensing algorithms and methods in the CR system to locate unoccupied spectrum segments in an efficient and accurate manner. Constraints of such spectrum sensing algorithms and methods may include the primary spectrum users not providing any spectrum usage information for the CR users.

Additional constraints may include the primary spectrum user signals coming from transmitters located at the proximities of CR receivers or at very distant places. Thus, spectrum-sensing algorithms and methods may need to detect the primary signals with extremely low power-level even below the sensitivity requirement of the link between the incumbent spectrum users. Moreover, these primary spectrum user signals or CR user signal may have the signal power enough to go beyond the CR receiver's dynamic range. This wide dynamic range of received signals may be a very challenging issue to guarantee the detection sensitivity as well as the detection reliability. When a threshold value is applied to this wide range of signal level case, it may cause mis-detection events for the sake of false alarm rate. Otherwise, it may increase false alarm rate to provide better detection sensitivity. Therefore, the threshold selection may be an important factor for the uniform performance of the spectrum sensing algorithms and methods.

Once the above described constraints are addressed, a further constraint is that the time consumed to detect or sense the spectrum over wideband frequency span should be minimized. In other words, the sensing time should be minimized to improve the overall spectral efficiency through the spectrum sensing algorithms and methods. Accordingly, there is a need in the industry for spectrum sensing algorithms and methods in the CR system to locate unoccupied spectrum segments in an efficient and accurate manner.

SUMMARY OF INVENTION

According to an embodiment of the invention, there is a cognitive radio for utilizing limited frequency spectrum resources. The cognitive radio may include one or more spectrum sensing algorithms or methods in conjunction with frequency-agile operation. The spectrum sensing algorithms or methods may utilize wavelet transforms to provide a multi-resolution sensing feature. Spectrum sensing algorithms or methods in accordance with an embodiment of the invention may include a tri-stage procedure: (i) a coarse-scanning stage, (ii) a fine-scanning stage, and (iii) a final decision stage. Other embodiments of the invention may include alternative or fewer combinations of the tri-stage procedure. In accordance with an embodiment of the invention, for the decision stage, double testing methods (i.e., channel power testing and peak-count testing) may be applied to spectrum estimation results to decide the channel usage status in conjunction with dual-mode thresholds (e.g., strong-mode and weak-mode thresholds). Moreover, mode specific averaging options may be available in accordance with other embodiments of the invention to minimize the overall sensing time.

According to an example embodiment of the invention, there is a spectrum-sensing method. The method may include receiving an input spectrum having a plurality of channels, performing a coarse scan of the plurality of channels of the input spectrum to determine one or more occupied candidate channels and vacant candidate channels, where the coarse scan is associated with a first resolution bandwidth and a first frequency sweep increment, performing a fine scan of the occupied candidate channels and the vacant candidate channels to determine actually occupied channels and actually vacant channels, where the fine scan is associated with a second resolution bandwidth and a second frequency sweep increment, and storing an indication of the actually occupied channels and the actually vacant channels.

According to another example embodiment of the invention, there is a spectrum-sensing method. The method may include providing an input radio frequency (RF) spectrum having a plurality of channels, and analyzing the plurality of channels of the input RF spectrum using a coarse-scanning stage to determine one or more strong candidate channels, weak candidate channels, and vacant candidate channels, where the coarse-scanning stage is associated with a first resolution bandwidth and a first frequency sweep increment. The method may also include analyzing the one or more strong candidate channels, weak candidate channels, and vacant candidate channels using a fine-scanning stage to determine actually occupied channels and actually vacant channels, where the fine-scanning stage is associated with a second resolution bandwidth and a second frequency sweep increment, and storing an indication of the actually occupied channels and the actually vacant channels.

According to yet another example embodiment of the invention, there is a spectrum-sensing system. The system may include an input radio frequency (RE) spectrum having a plurality of channels, first means for determining one or more strong candidate channels, weak candidate channels, and vacant candidate channels from the input RF spectrum, where the first means is associated with a first resolution bandwidth and a first frequency sweep increment, and second means for determining actually occupied channels and actually vacant channels based upon the one or more strong candidate channels, weak candidate channels, and vacant candidate channels, where the second means is associated with a second resolution bandwidth and a second frequency sweep increment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF INVENTION

Figure 1B:
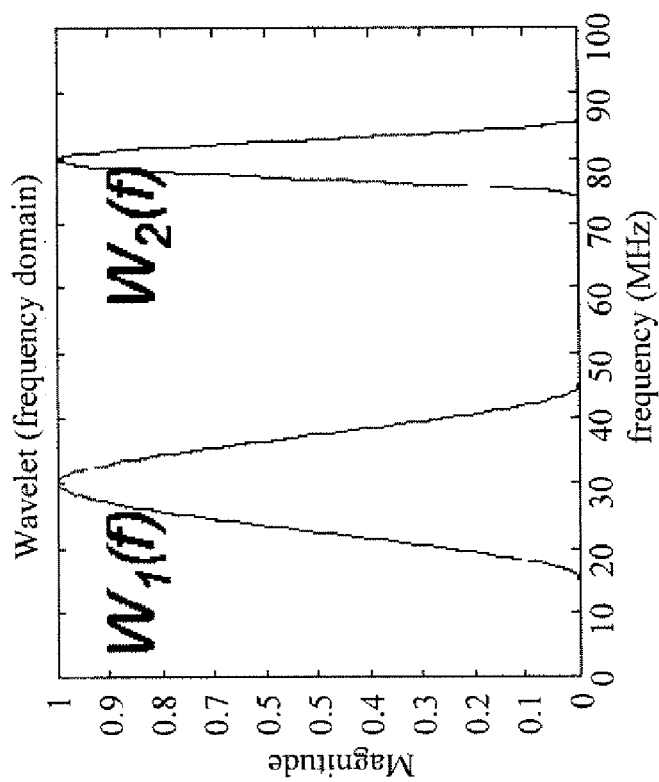
FIG. 1B illustrates the corresponding spectrums of FIG. 1A, according to an example embodiment of the invention.

Embodiments of the invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the invention may provide spectrum sensing algorithms and methods utilized in cognitive radios for exploiting limited spectrum resources. The cognitive radios may allow for negotiated and/or opportunistic spectrum sharing over a wide frequency range covering a plurality of mobile communication protocols and standards. In accordance an embodiment of the invention, the cognitive radio may be able to intelligently detect the usage of a segment in the radio spectrum and to utilize any temporarily unused spectrum segment rapidly without interfering with the communication between other authorized users. The use of these cognitive radios may allow for a variety of heterogeneous wireless networks to coexist with each other. These wireless networks may include cellular networks, wireless personal area networks (PAN), wireless local area networks (LAN), and wireless metro area networks (MAN). These wireless networks may also coexist with television networks. Other types of networks may also be available in accordance with other embodiments of the invention.

I. Multi-Resolution Spectrum Scanning (MRSS)

In accordance with an embodiment of the invention, a spectrum-sensing module of a cognitive radio may utilize wavelet transforms in providing a multi-resolution spectrum sensing feature, which may be referred to as Multi-Resolution Spectrum Scanning (MRSS). The use of MRSS for the spectrum-sensing module of a cognitive radio may allow for a flexible detection resolution without necessarily requiring an increase in the hardware burden.

During the operation of MRSS, a wavelet transform may be applied to a given time-variant signal to determine a correlation between the given time-variant signal and a basis function (e.g., a wavelet pulse) for the wavelet transform. This correlation may be known as the wavelet transform coefficient, which may be initially determined in analog form, according to an embodiment of the invention. The wavelet pulse that serves as the basis function for the wavelet transform utilized with MRSS may be varied according to an embodiment of the invention. For example, the wavelet pulses for the wavelet transform may be varied in bandwidth, carrier frequency, and/or time period. By adjusting the wavelet pulse width and/or the carrier frequency, the spectral contents provided through the wavelet transform coefficient for the given time-variant signal may be represented with a scalable resolution or multi-resolution. Indeed, by changing the wavelet pulse width and carrier frequency of the wavelet pulses after maintaining them within a certain interval, the wavelet transform may provide an analysis of the spectral contents of the time-variant signals in accordance with an embodiment of the invention.

A. Wavelet Pulse Selection

As described above, a wavelet transform, including a Fourier transform, may be applied to a time-variant signal in conjunction with a basis function may be used to derive a spectral representation of the signal provided in the time domain. Indeed, the correlation (e.g., a wavelet transform coefficient) of a time-variant signal and a basis function, perhaps a sinusoidal basis function, at a given frequency may provide for a spectral component at the frequency.

Figure 1A:
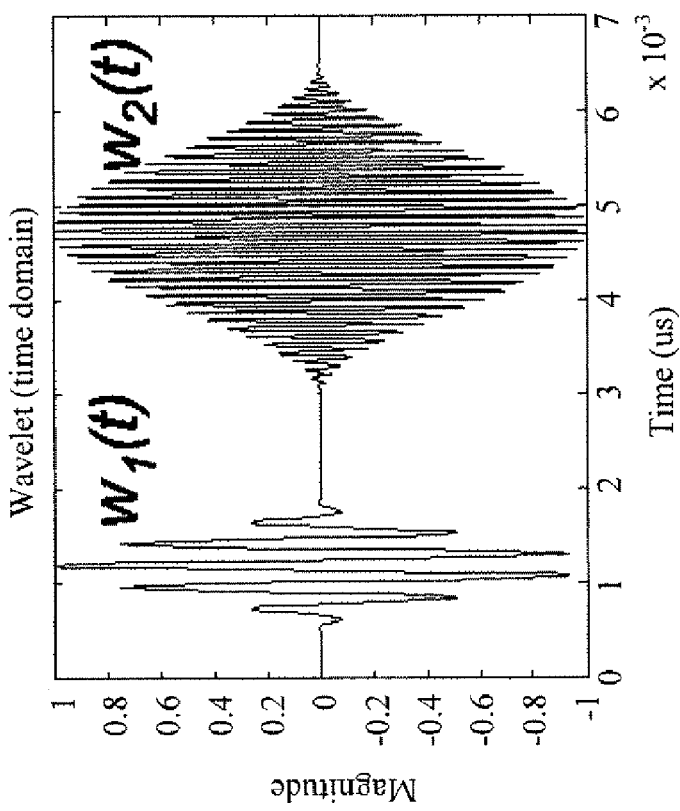
FIG. 1A illustrates example wavelet waveforms $w_1(t)$ and $w_2(t)$ having different pulse widths, according to an example embodiment of the invention.

The wavelet pulse utilized as the basis function of the wavelet transform may be varied according to an example embodiment of the invention. In particular, certain types of basis functions for wavelet pulses may have resolution bandwidth as an additional freedom-of-design, according to an example embodiment of the invention. By adjusting a wavelet pulse's width and carrier frequency, the spectral contents provided by the wavelet transform correlation may be represented with scalable resolution or multi-resolution. FIG. 1A illustrates two examples of wavelet-waveforms $w_1(t)$ and $w_2(t)$ having different pulse widths, according to an example embodiment of the invention. FIG. 1B illustrates the corresponding spectrums of FIG. 1A that have different resolution bandwidths, according to an example embodiment of the invention.

B. Block Diagram for MRSS Implementation

Figure 2:
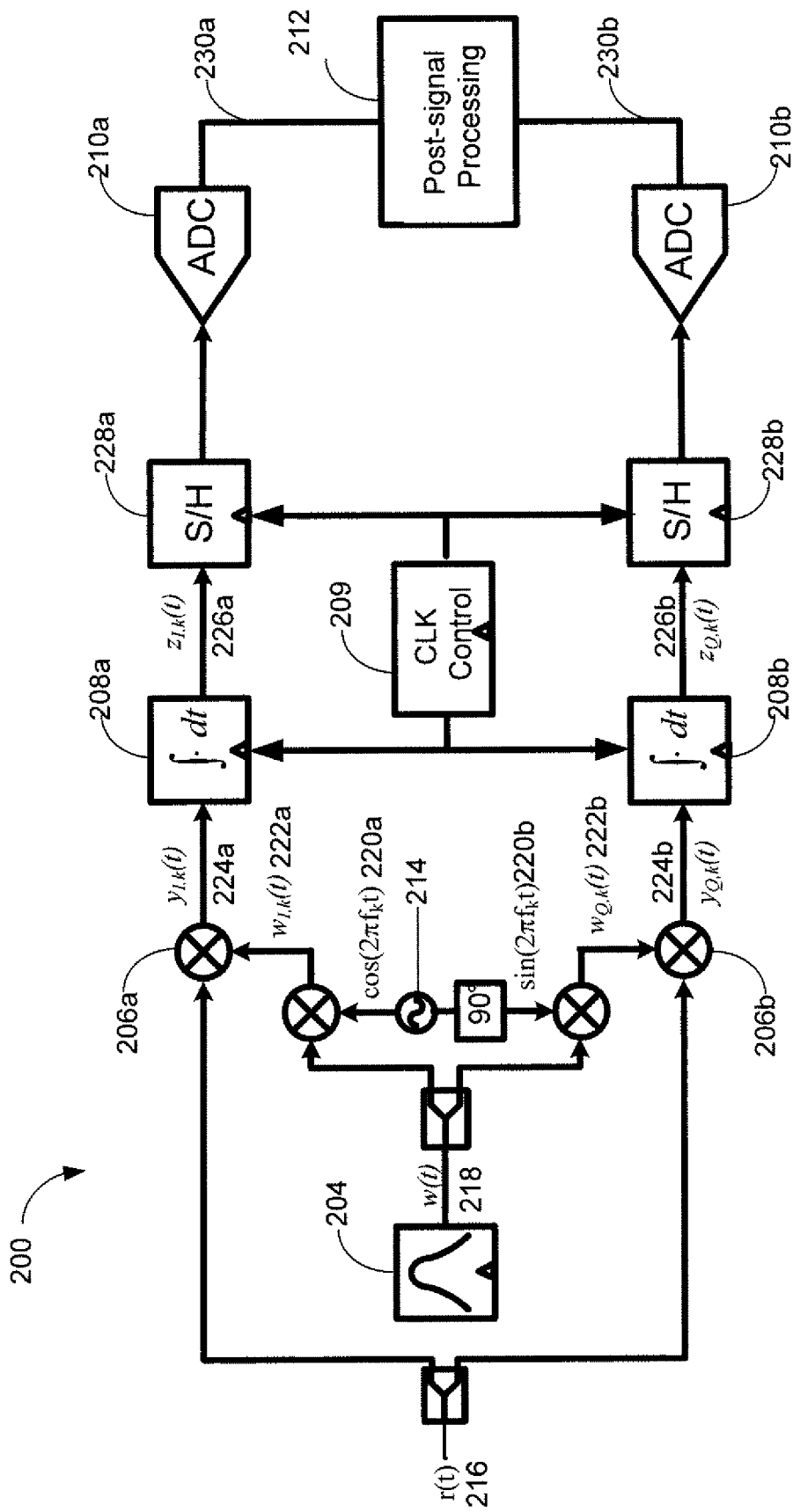
FIG. 2 illustrates a block diagram of an MRSS front-end implementation in accordance with an example embodiment of the invention.

FIG. 2 illustrates a block diagram for an exemplary MRSS front-end 200 in accordance with an embodiment of the invention. In accordance with an embodiment of the invention, the MRSS front-end 200 may include an analog wavelet waveform generator 204, analog multipliers 206a, 206b, analog integrators 208a, 208b, and a timing clock 209. The timing clock 209 may provide timing signals utilized by the wavelet generator 204, the analog integrators 208a, 208b, and/or the sample and hold (S/H) circuits 228a, 228b.

Still referring to FIG. 2, the wavelet generator 204 may generate a chain of wavelet pulses w(t) 218 that are modulated with I- and Q-sinusoidal carriers $\cos(2\pi f_k t)$ 220a and $\sin(2\pi f_k t)$ 220b with a given local oscillator 214 (LO) frequency to form a chain of modulated wavelet pulses $w_{I,k}(t)$ 222a, $w_{Q,k}(t)$ 222b. With the I- and Q-sinusoidal carriers 220a, 220b, the I-component signal 220a may be equal in magnitude but 90 degrees out of phase with the Q-component signal 220b. As part of the wavelet transform, the chain of modulated wavelet pulses $w_{I,k}(t)$ 222a, $w_{Q,k}(t)$ 222b may then be multiplied by the time-variant input signal r(t) 216 by respective analog multipliers 206a, 206b to form analog input signals $y_{I,k}(t)$ 224a and $y_{Q,k}(t)$ 224b into the respective analog integrators 208a, 208b. The analog integrator 208 provides the output of the wavelet transform analog correlation values $z_{I,k}(t)$ 226a and $z_{Q,k}(t)$ 226b.

According to an example embodiment of the invention, these analog correlation values $z_{I,k}(t)$ 226a and $z_{Q,k}(t)$ 226b may be calculated using wavelet pulses w(t) 218 having a given spectral width—that is, the spectrum sensing resolution. The local oscillator 214 frequency of the I- and Q-sinusoidal carriers 220a, 220b may then be swept with a particular increment. Accordingly, the signal power magnitudes and the frequency values within the time-variant input signal r(t) 216 may be detected in the analog correlation values $z_{I,k}(t)$ 226a and $z_{Q,k}(t)$ 226b over the spectrum range of interest.

More specifically, by applying a narrow wavelet pulse w(t) 218 and a large tuning step size of the LO 214 frequency, an MRSS front end 200 in accordance with an embodiment of the invention may examine a very wide spectrum span in a fast and sparse manner. By contrast, very precise spectrum searching may be realized with a wide wavelet pulse w(t) 218 and the delicate or small adjustment of the LO 214 frequency. Using this scalable feature applicable to the modulated wavelet pulses $w_{I,k}(t)$ 222a, $w_{Q,k}(t)$ 222b that comprise the wavelet transform, multi-resolution may be achieved without any additional digital hardware burdens.

The analog correlation values 226a ($Z_{I,k}(t)$), 226b ($Z_{Q,k}(t)$) determined at the outputs of analog integrators 208a, 20b may be provided to analog-to-digital converters (ADCs) 210a, 210b. According to an example embodiment of the invention, sample-and-hold (S/H) circuits 228a, 228 may be provided to hold voltages of analog correlation values $Z_{I,k}(t)$ 226a and $Z_{Q,k}(t)$ 226b to allow the ADCs 210a, 210b to properly digitize the analog correlation values $z_{I,k}(t)$ 226a and $z_{Q,k}(t)$ 226b. The digitized correlation values 230a, 230b may be provided to post-signal processing module 212 for processing and decision of the spectrum usage status.

Figure 3A:
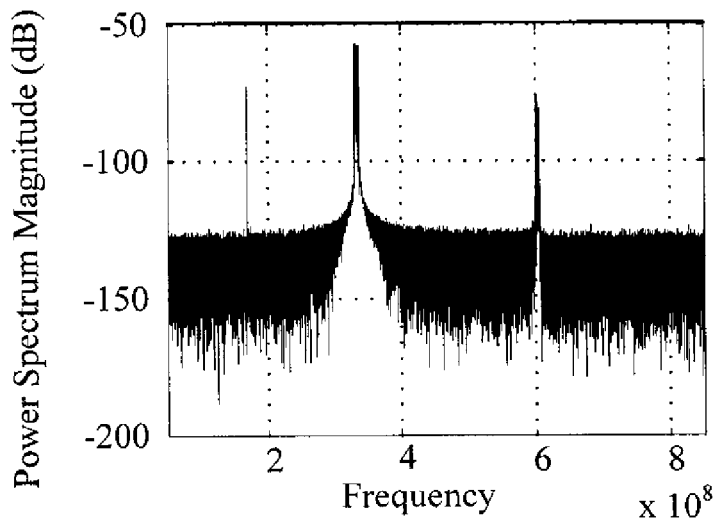
FIG. 3A illustrates an example input RF signal spectrum, according to an example embodiment of the invention.
Figure 3B:
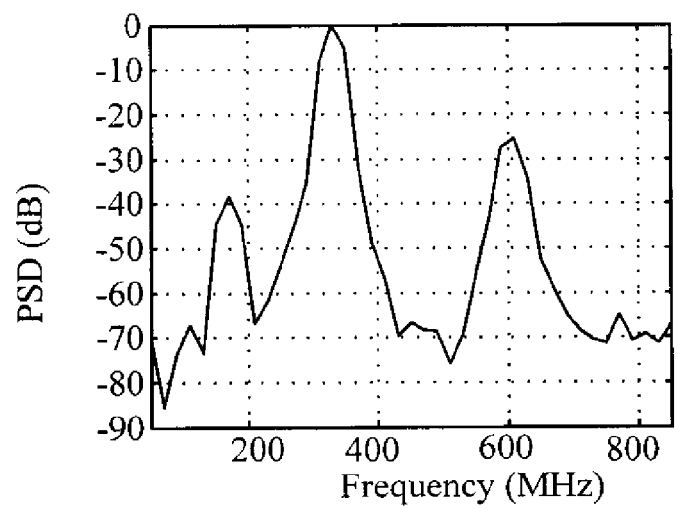
FIG. 3B illustrates spectrum detection in a sparse manner, according to an example embodiment of the invention.
Figure 3C:
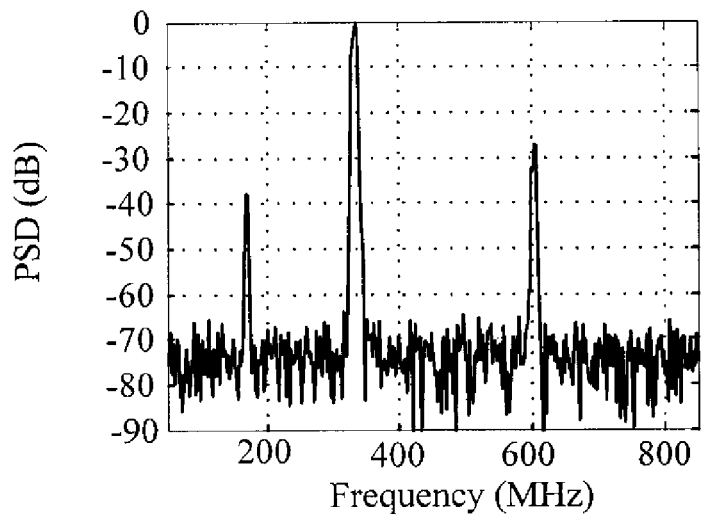
FIG. 3C illustrates spectrum detection in a precise manner, according to an example embodiment of the invention.

FIGS. 3A-3C illustrates a scalable resolution control in the frequency domain with the use of wavelet pulses. FIG. 3A illustrates an example input RF signal spectrum, according to an example embodiment of the invention. FIG. 3B illustrates an example spectrum detection in a sparse or coarse manner, according to an example embodiment of the invention. More specifically, in FIG. 3B, the MRSS simulation result illustrates a wideband spectrum shape with blunt peaks for three input signals. FIG. 3C illustrates example spectrum detection in a precise or fine manner, according to an embodiment of the invention. In particular, in FIG. 3, three sharp peaks are shown for each signal, indicating a better detection performance in terms of sensing resolution.

The sparse or coarse MRSS procedure illustrated by FIG. 3B may take a shorter sensing time compared to the precise or fine MRSS procedure illustrated by FIG. 3C. Therefore, the overall MRSS procedure in accordance with an embodiment of the invention may be operative to examine a wideband spectrum in a fast and sparse manner and, if needed, in a precise manner without any increase of hardware burden.

II. Spectrum-Sensing and Decision Procedure

Figure 4:
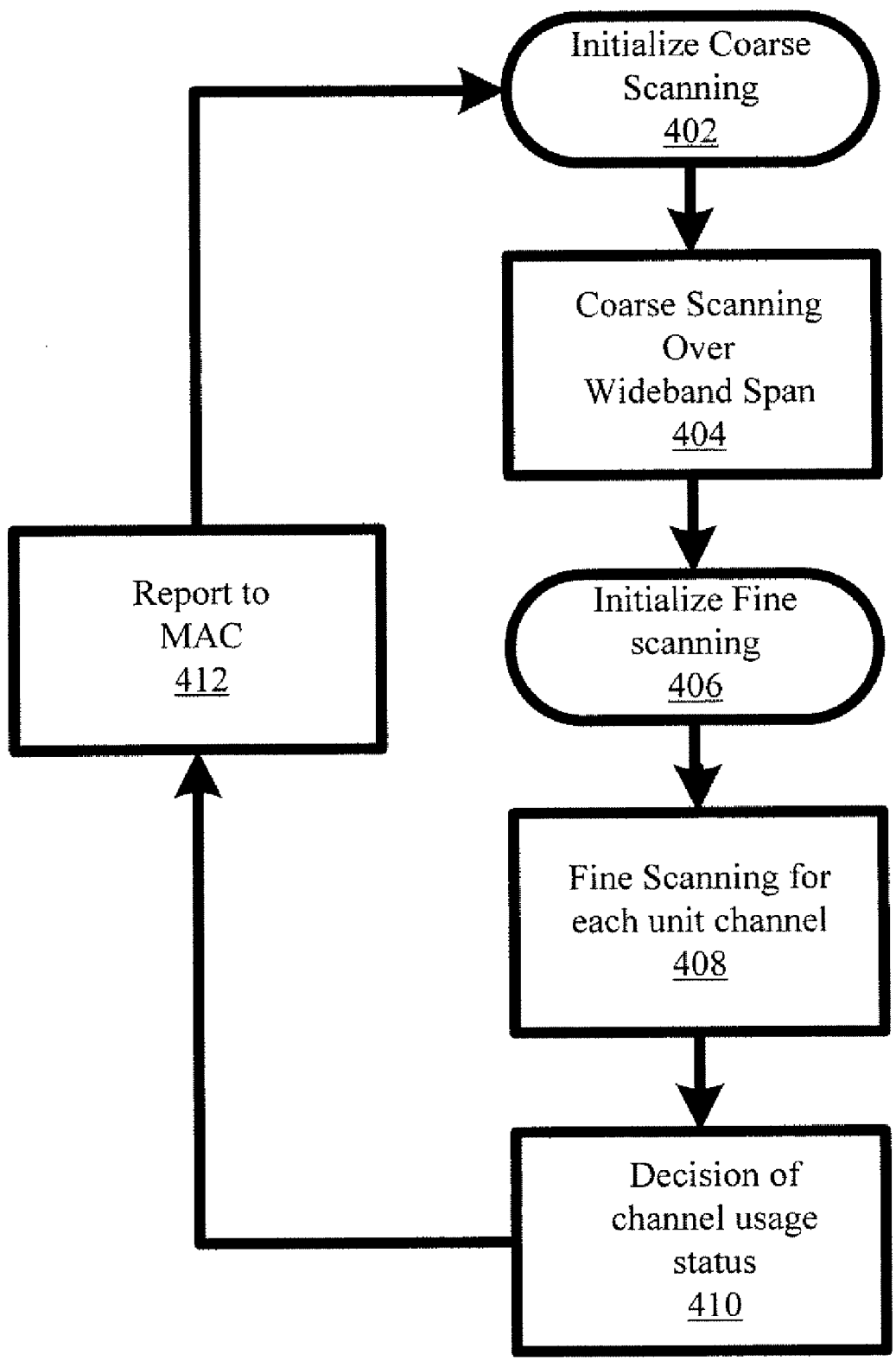
FIG. 4 illustrates an example flow diagram of a spectrum-sensing and decision procedure, according to an example embodiment of the invention.

In order to improve accuracy and reliability performances of spectrum sensing, a tri-stage spectrum sensing and decision procedure may be utilized in accordance with an embodiment of the invention. FIG. 4 illustrates an example flow diagram of a spectrum-sensing and decision procedure, according to an embodiment of the invention.

Referring to FIG. 4, the coarse scanning procedure may be initialized (block 402). The coarse scanning stage may estimate the channel power for a wideband spectrum and classifies each unit channel into one of three candidate channels—a vacant channel, a strong signal channel, or a weak signal channel (block 404). The fine scanning procedure may then be initialized (block 406), and the resulting candidate channels may be scanned in a precise manner in a fine scanning procedure (block 408). In this fine scanning procedure of block 408, double testing (e.g., channel power testing and peak-count testing) may performed for each channel. If each channel passes both of the tests, then the decision stage may announce the final result of spectrum usage status "vacant" or "occupied" for each channel (block 410).

A. Coarse Scanning Stage

Figure 5:
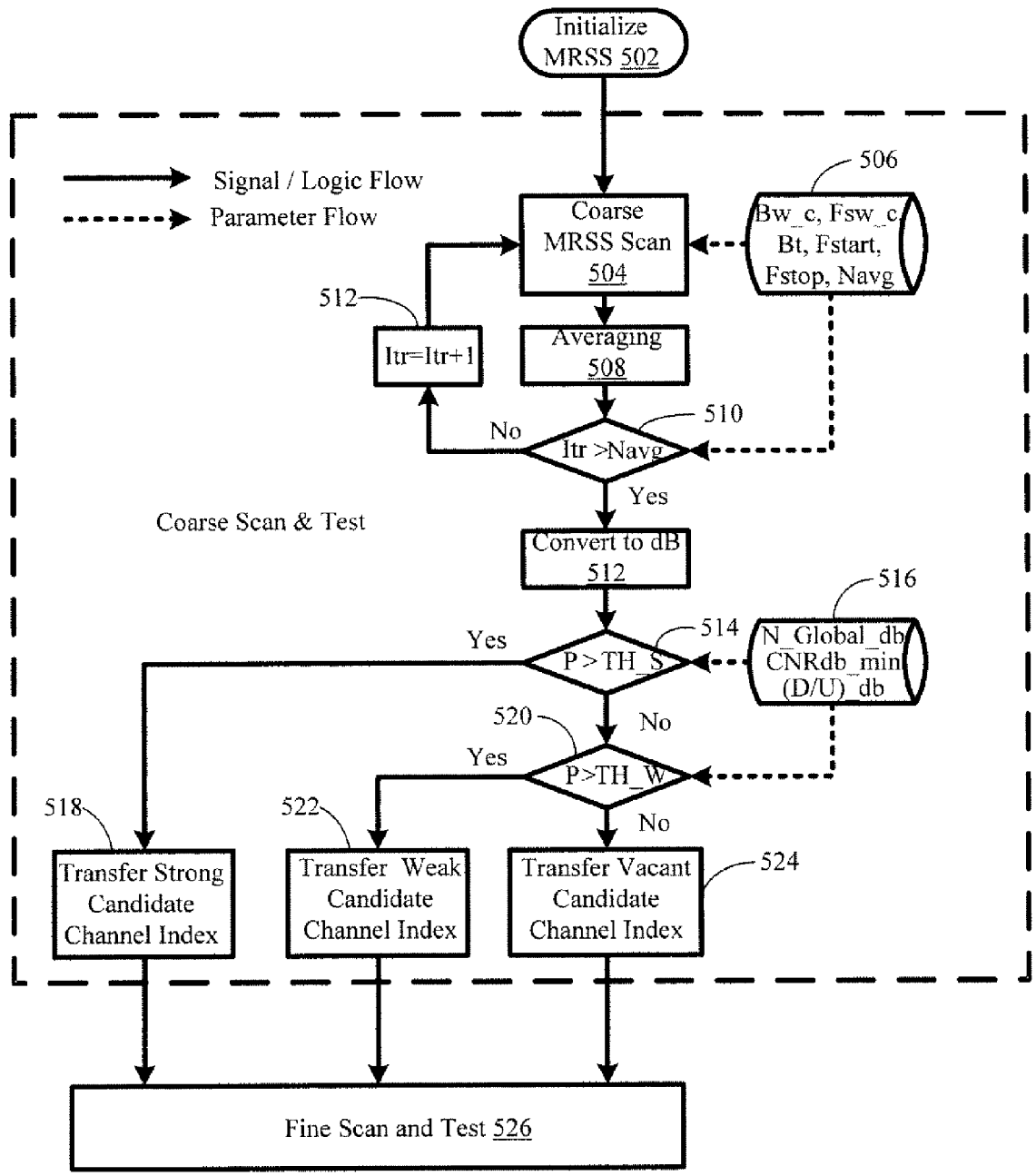
FIG. 5 illustrates a flow diagram of the coarse scanning procedure, according to an example embodiment of the invention.

A coarse scanning procedure in accordance with an example embodiment of the invention may examine input RF spectrum over wide span with coarse resolution MRSS. The resulting coarse MRSS result for each channel may be compared with the dual thresholds to classify the corresponding channel index to three categories—vacant candidate channel and strong, weak signal-reception candidate channels. FIG. 5 illustrates a flow diagram of a course scanning procedure, according to an example embodiment of the invention.

Referring to FIG. 5, the MRSS procedure may be initialized (block 502), according to an example embodiment of the invention. Input RF spectrum over a wide span may then be scanned with coarse resolution MRSS parameters (provided by block 506) to provide power estimation values, $P_{CH,k}$, for each unit channel K (block 504). These coarse MRSS parameters may include the wavelet bandwidth Bw_c, the frequency sweep increment Fsw_c, the bandwidth Bt of the target primary signal, the start frequency Fstart, the stop frequency Fstop, and the number of averages Navg that determines the number of iterations for the coarse MRSS scan. According to an embodiment of the invention, the wavelet bandwidth Bw_c and the frequency sweep increment Fsw_c may be related to the bandwidth, Bt, of the target primary signal according to eq. (1) and (2) below.

$$Bw\_c = (Bt/2) \quad \text{eq. (1)}$$

$$Fsw\_c = Bt \quad \text{eq. (2)}$$

In order to decrease the effect of noise on the power estimation values $P_{CH,k}$, the coarse MRSS scan of block 504 may be repeated N_avg times, and the resulting power estimation values $P_{CH,k}$ of block 504 may be averaged for each channel K (block 508). Accordingly, the coarse MRSS scan of block 504 may be repeated N_avg times, with the iteration counter Itr incremented each time (block 512), until the iteration counter Itr reaches the limit of Navg (block 510).

It will be appreciated that as the number of averages N_avg increases, the averaged power estimation value $P_{CH,k}$ for the k-th channel may converge to a certain value that may be substantially immune to the input noise effect. However, the averaging process may increase the sensing time consumed for the coarse spectrum-sensing procedure. Thus, the number of averages, N_avg, may be selected to provide noise immunity as well as to minimize or otherwise achieve the desired coarse spectrum-sensing time.

After the averaged power estimation value $P_{CH,k}$ for the channels K have been determined, the averaged power estimation values $P_{CH,k}$ may optionally be converted to decibels (dB), according to an example embodiment of the invention (block 512). The averaged power estimation values $P_{CH,k}$ may then be subject to at least dual threshold testing to classify the channels K as occupied (e.g., weak, strong) or vacant candidate channels, as will be described with respect to blocks 514 and 520 below.

Generally, dual threshold testing in accordance with an embodiment of the invention may be utilized since the primary spectrum user signals may have wide range of power levels. Indeed, a single threshold value, applied to the wide range of signal level powers may be insufficient due to mis-detection events and false alarm rates. For example, if the single threshold value were set too high, there will be too few channels K that will not be detected being occupied. On the other hand, if the single threshold value were set too low, there will be too many channels K that will be detected as being occupied.

Figure 6:
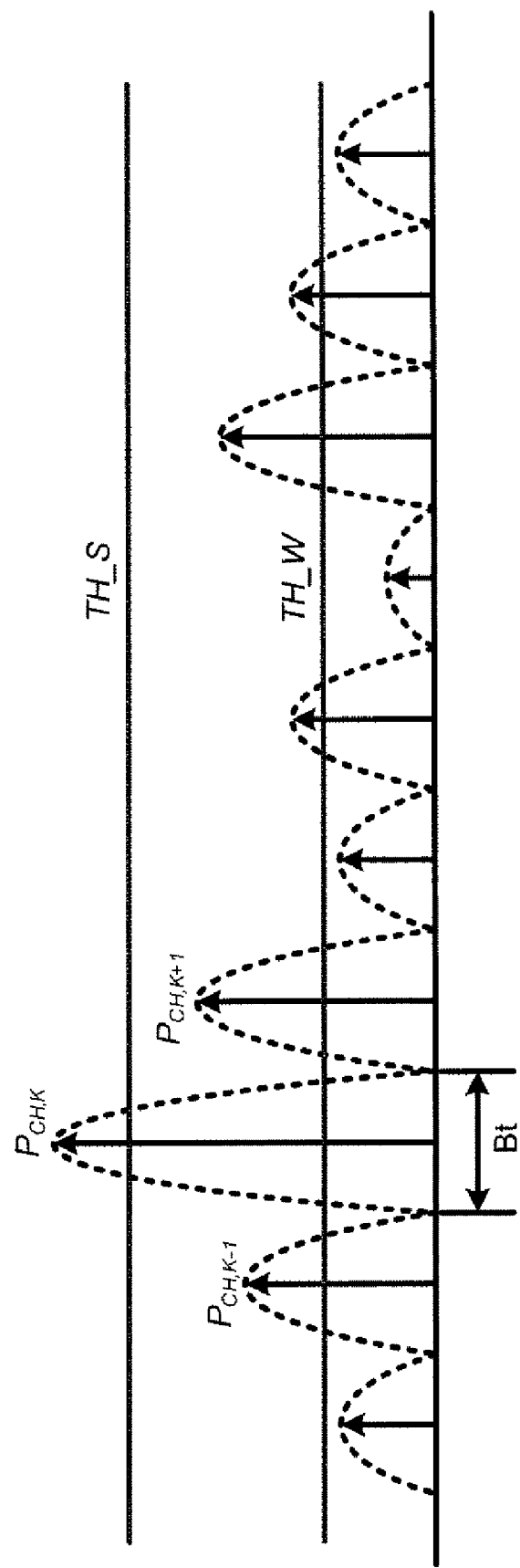
FIG. 6 illustrates an example result of a coarse MRSS, according to an example embodiment of the invention.

Referring to FIG. 5, in order to provide the desired dynamic range of the coarse spectrum sensing procedure in accordance with an embodiment of the invention, dual-mode threshold levels may be applied to the averaged channel power values $P_{CH,k}$, as illustrated in blocks 514 and 520. By comparing these channel power values $P_{CH,k}$ using a dual mode threshold test—a strong threshold TH_S test for strong mode (block 514) and a weak threshold TH_W test for weak mode (block 520)—each channel K may be classified as a "vacant" or occupied (e.g., strong, weak) candidate channel. In particular, if the channel power value $P_{CH,k}$ for a particular channel K does not satisfy both the strong threshold TH_S test (block 514) and the weak threshold TH_W test (block 520), then the channel K will be classified as a "vacant" candidate channel with noise-level power reception and added to the vacant candidate channel index (block 524). If the channel power value $P_{CH,k}$ for a particular channel K satisfies the strong threshold TH_S test (block 514), then the channel K will be classified as an occupied candidate channel with "strong" signal reception and added to the strong candidate channel index (block 518). If the channel power value $P_{CH,k}$ for a particular channel K does not satisfy the strong threshold TH_S test (block 514) but satisfies the weak threshold TH_W test (block 520), then the channel K will be classified as an occupied channel with "weak" signal reception and added to the weak candidate channel index (block 518). FIG. 6 illustrates the strong threshold TH_S and the weak threshold TH_S as applied to a example plurality of channels K, according to an example embodiment of the invention.

In accordance with an example embodiment of the invention, the two threshold levels—the strong threshold TH_S of block 514 and the weak threshold TH_W of block 520—may be determined based upon certain threshold parameter values provided by block 516 in accordance with eq. (3) and eq. (4) below.

$$TH\_S = N\_global\_db + (D/U)\_dB + CNRdb\_\min \quad \text{eq. (3)}$$

$$TH\_W = N\_global\_db + CNRdb\_\min \quad \text{eq. (4)}$$

In eq. (3) above, the (D/U)_dB may be the ratio of the desired and undesired signal power levels of the primary signal reception events. The CNRdb_min in eq. (3) and eq. (4) may be the carrier-to-noise ratio for the signal reception of the sensitivity case of the spectrum sensing technique. The global noise reference level N_global_db in eq. (3) and eq. (4) may be the minimum of the coarse MRSS scanned $P_{CH,k}$ values, according to an example embodiment of the invention.

When a local noise reference estimation value is used as the threshold level selection, it may not be applied to various signal reception cases with wide range of signal power levels. In order to improve the reliability of this noise reference level, the global noise reference level N_global_db may be selected from the noise-level estimation values scanned over very wideband spectrum enough to encounter at least a vacant channel. Moreover, this N_global_db may also be used as the reference of the channel power testing in the following fine scanning procedure.

Still referring to FIG. 5, after the coarse scanning procedure is performed on the input RF spectrum, the channel index lists classified to three categories Iv, Is, and Iw corresponding to "vacant," "strong," and "weak" channels K, respectively, may be transferred to the fine scanning and testing procedure for the final decision of each channel K usage status (block 526).

B. Fine Scanning Stage

Figure 7:
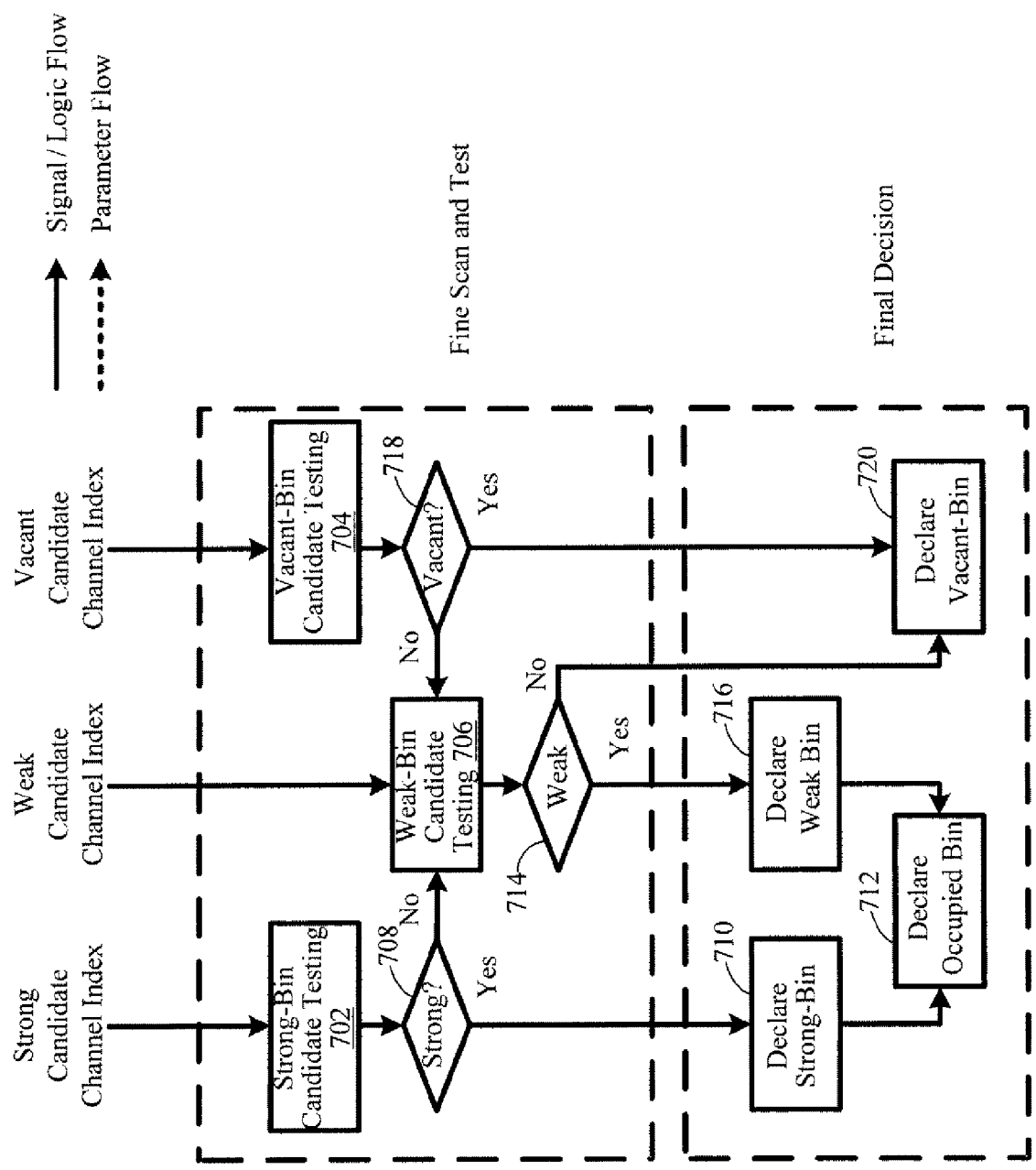
FIG. 7 shows an example flow diagram of a fine scanning procedure and a final decision procedure, according to an example embodiment of the invention.
Figure 8A:
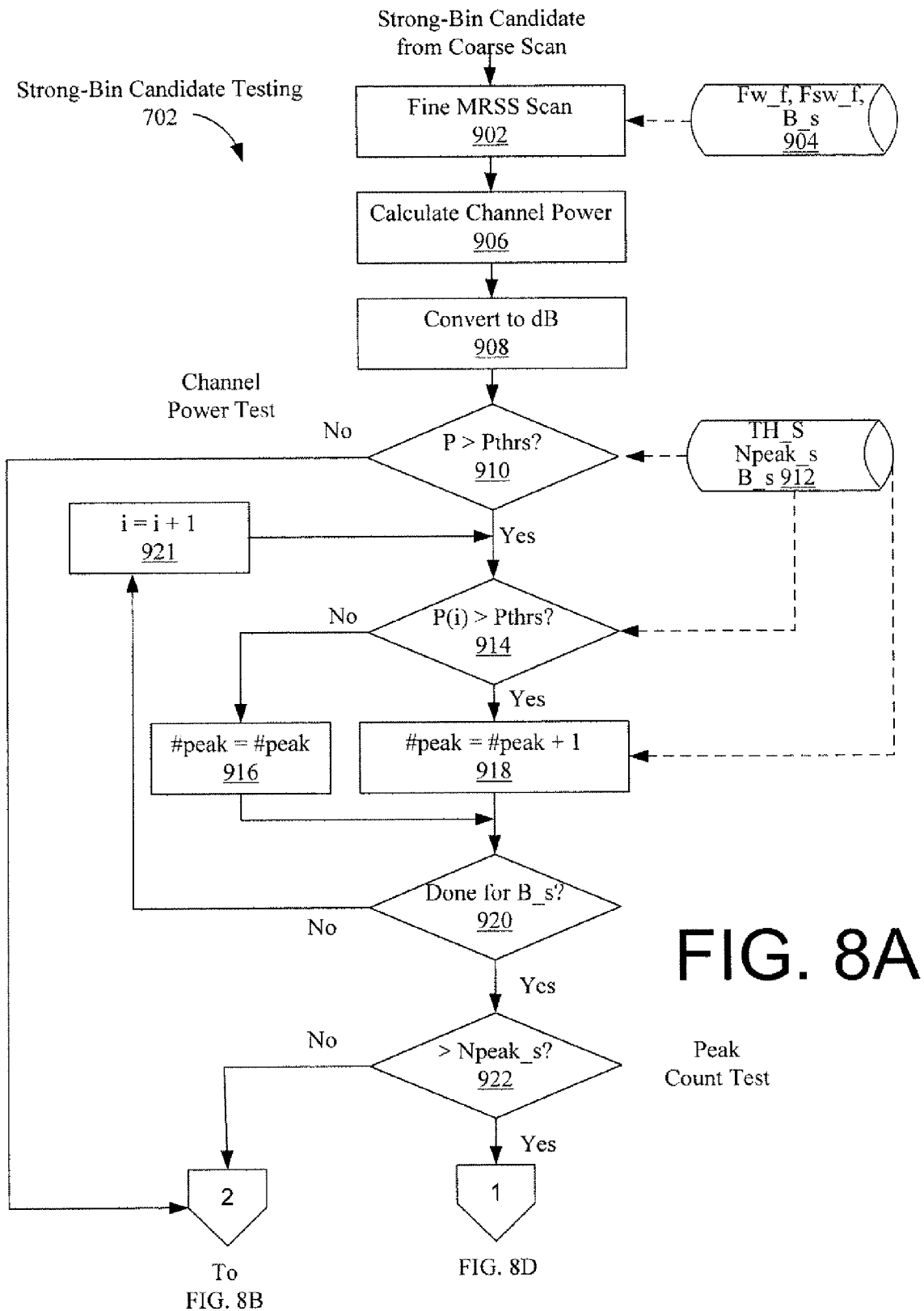
FIGS. 8A-8D illustrate a more detailed flow chart of a fine scanning procedure and the final decision procedure, according to an example embodiment of the invention.
Figure 8B:
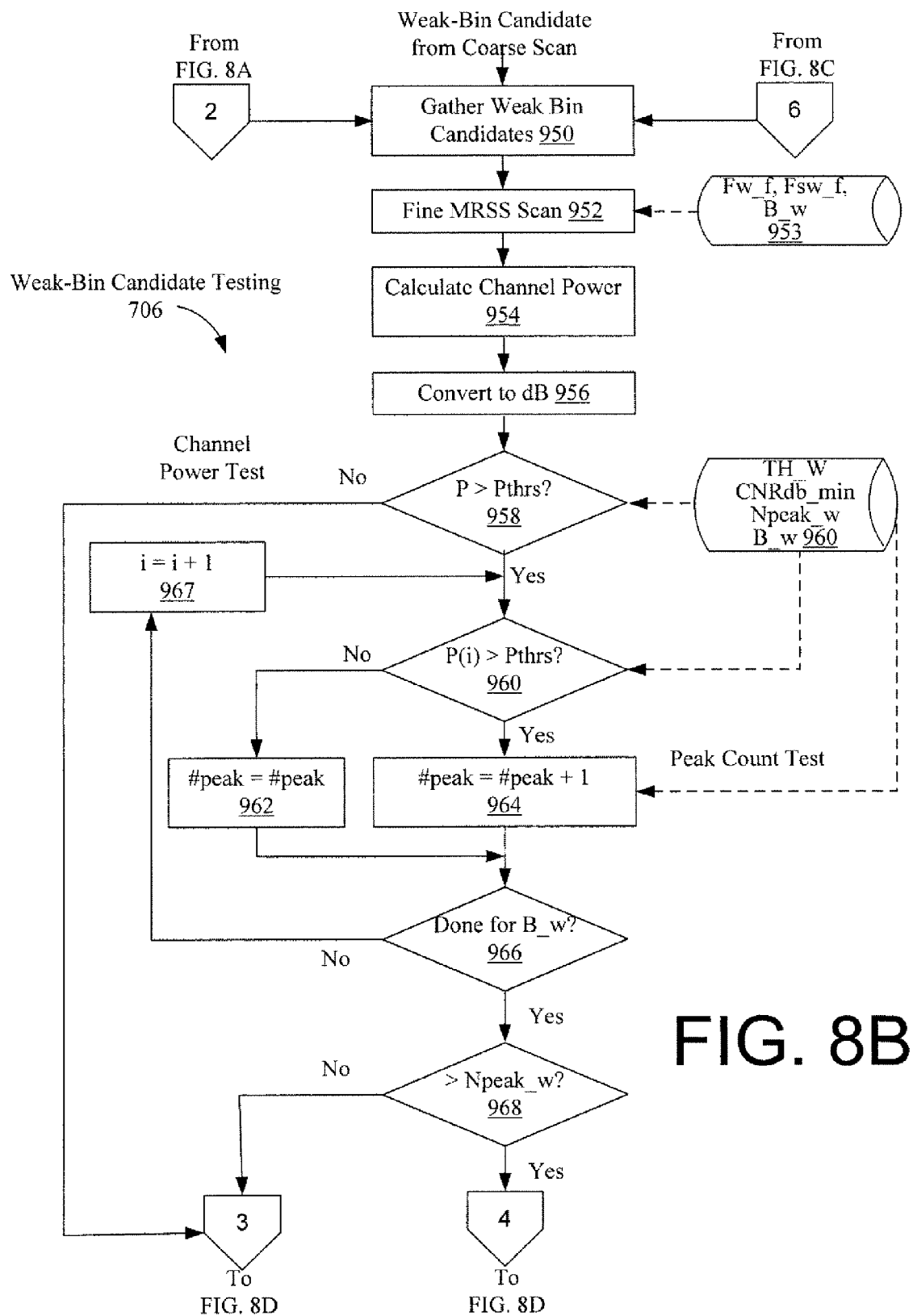
Figure 8C:
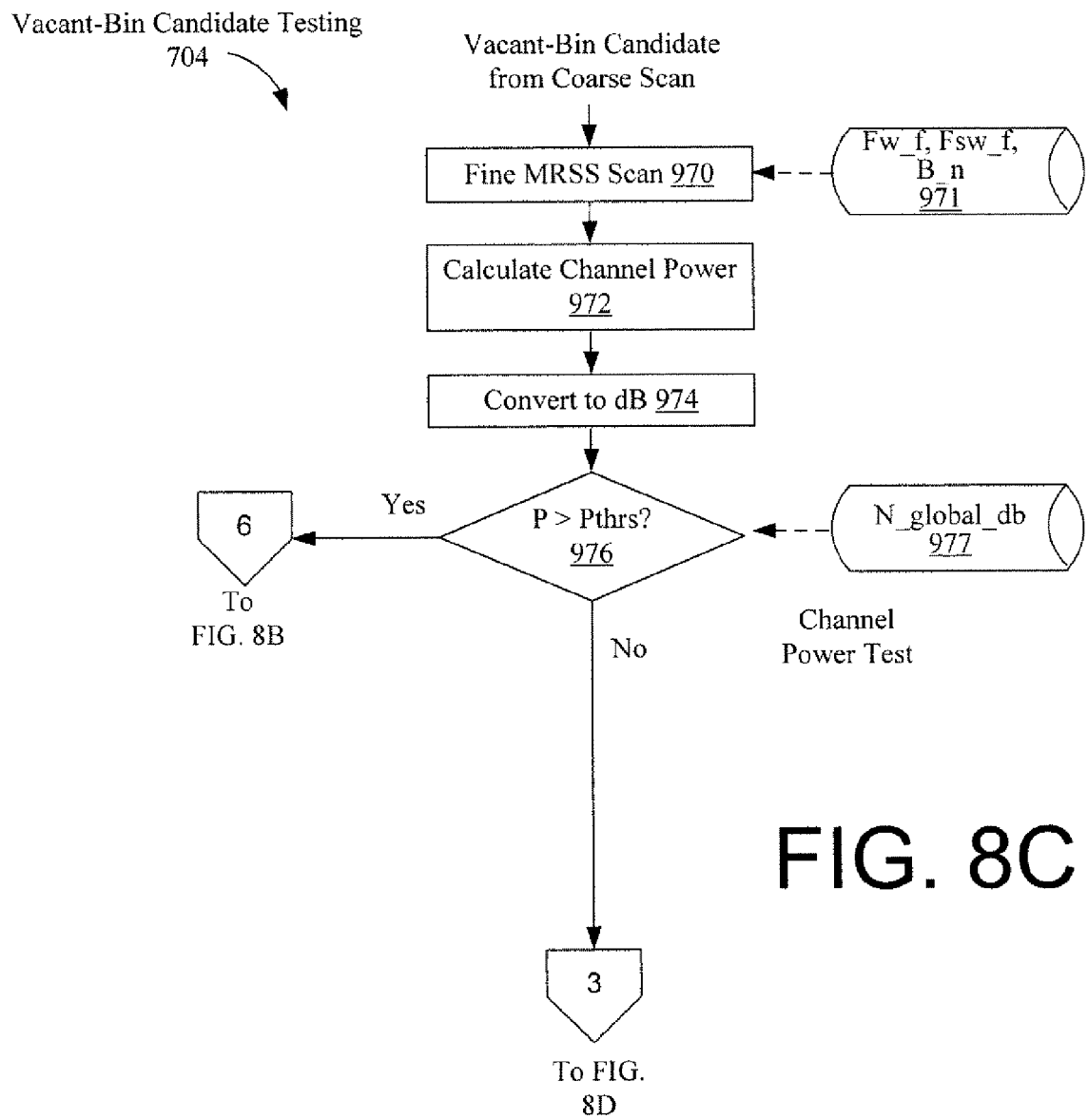
Figure 8D:
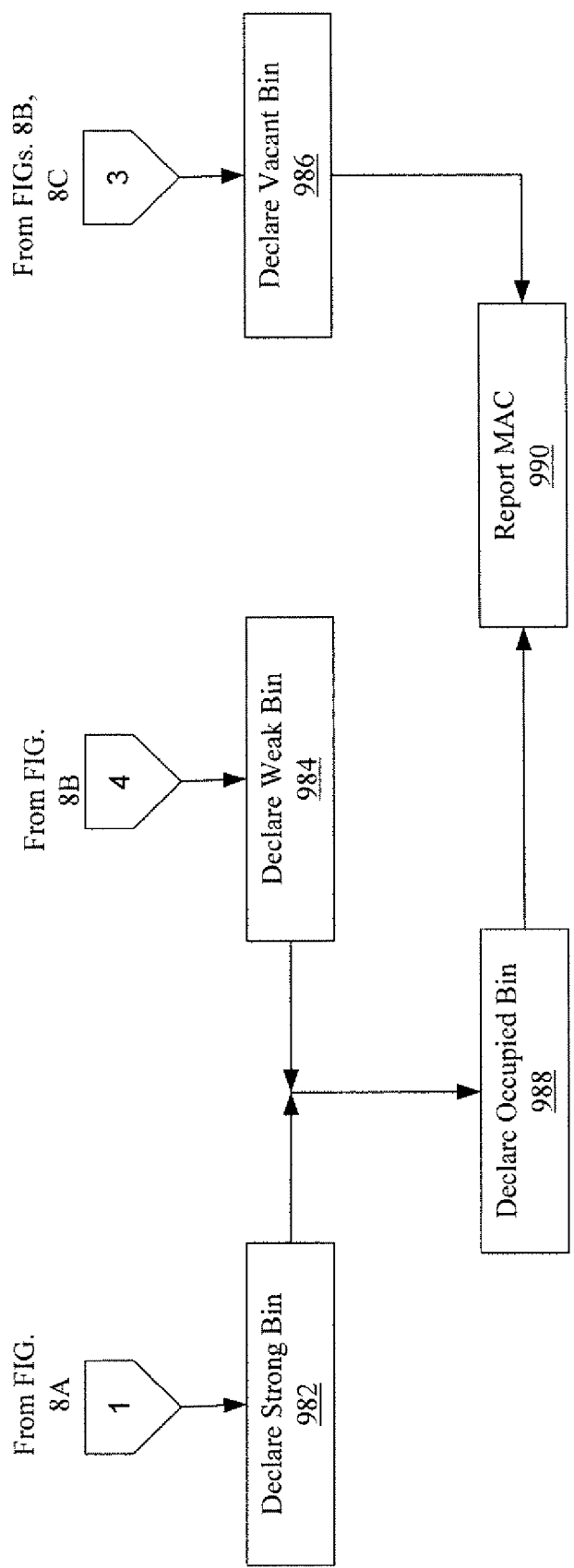
Figure 9:
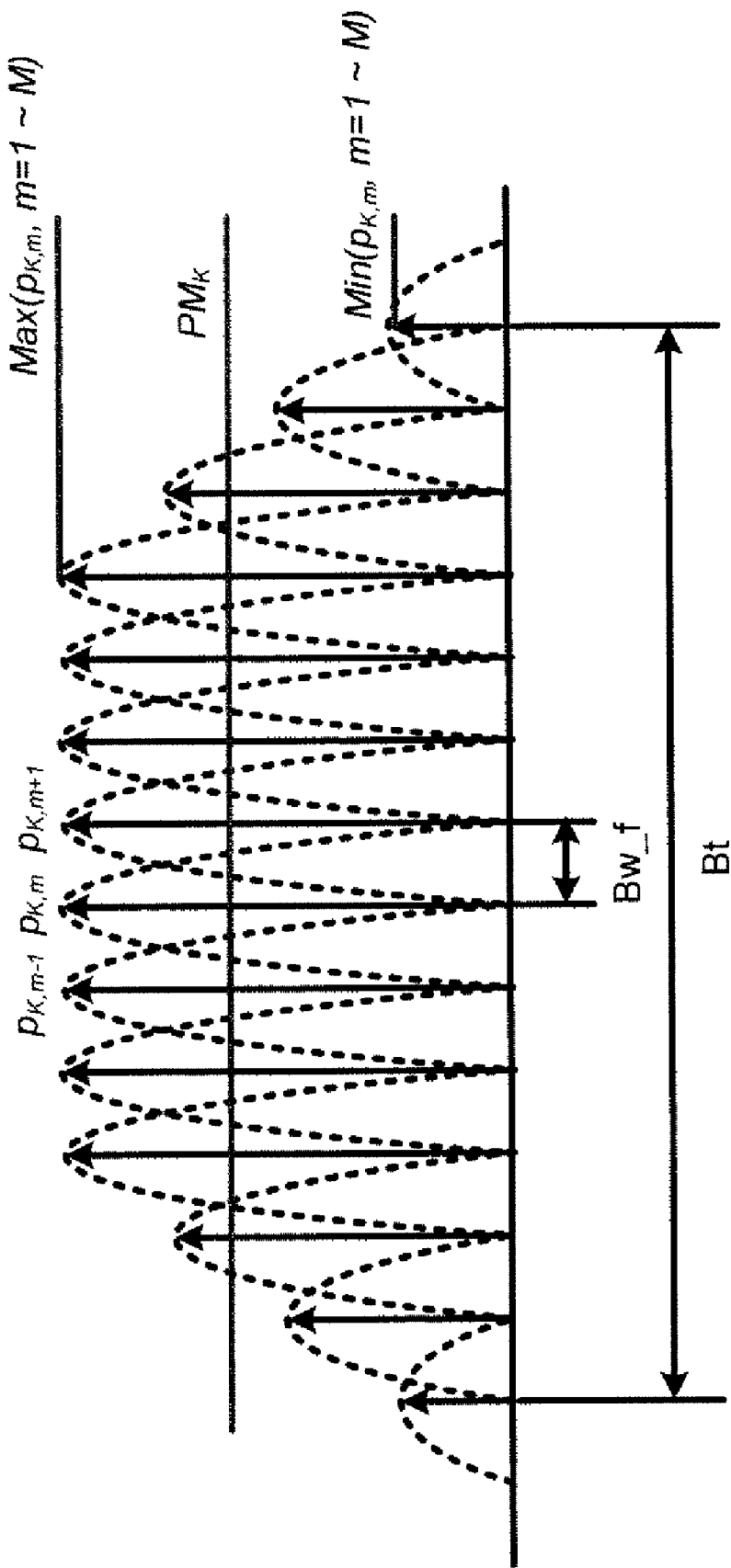
FIG. 9 illustrates an example result of the fine MRSS, according to an embodiment of the invention.

The candidate channel index lists Iv, Is, and Iw generated in blocks 524, 518, and 522 of FIG. 5 may be investigated precisely in a fine scanning procedure through the examination methods and criteria corresponding to each channel category. FIG. 7 shows a flow diagram of the fine scanning procedure, according to an embodiment of the invention.

As illustrated in FIG. 7, each of the strong, weak, or vacant candidate channel indexes Iv, Is, Iw may be provided for respective vacant-bin candidate testing (block 704), strong-bin candidate testing (block 702), and weak-bin candidate testing (block 706), according to an example embodiment of the invention.

If a channel K on the vacant candidate channel index Iv is confirmed to be a vacant channel (block 718), then the channel K may be declared as a vacant channel (block 720). On the other hand, if the channel K on the vacant candidate channel index Iv is not confirmed to be a vacant channel (block 718), then the channel K may be additionally subject to weak-bin candidate testing (block 706).

Likewise, if a channel K on the strong candidate channel index Is is confirmed to be a strong channel (block 708), then the channel K may be declared as a strong channel (block 710) and/or occupied (block 712). On the other hand, if a channel K on the strong candidate channel index Is is not confirmed to be a strong channel (block 708), then the channel K may additionally be subject to weak-bin candidate (block 706).

Similarly, if a channel K, either from the weak candidate channel index Iw or blocks 708, 718, is confirmed to be a weak channel (block 714), then the channel K may be declared as a weak channel (block 716) and/or occupied (block 712). On the other hand, if a channel K is not confirmed to be a weak channel (block 714), then it may be declared as a non-occupied channel (i.e., vacant channel) (block 720).

The vacant-bin candidate testing (block 704), strong-bin candidate testing (block 702), and weak-bin candidate testing (block 708) introduced in FIG. 7 will now be discussed in further detail with respect to FIGS. 8A-D and 9.

B.1. Vacant-Bin Channel Testing

Referring to FIGS. 8A-8D, in order to investigate the vacant channel candidates, each channel spectrum listed in the vacant candidate channel index Iv may be finely scanned in block 970 with fine resolution MRSS parameters provided by block 971. The fine scanning in block 970 may generate a plurality of discrete power values $p_{K,m}$, where $p_{K,m}$ is the m-th discrete power value scanned for the K-th channel with fine scanning conditions. FIG. 10 illustrates examples of discrete power values $p_{K,m}$ that are obtained by scanning with fine scanning conditions.

The fine MRSS parameters provided by block 971 may include the wavelet sweep frequency Fw_f the frequency sweep increment Fsw_f, and the bandwidth Bt of the target primary signal. According to an example embodiment of the invention, the wavelet bandwidth Bw_f and the frequency sweep increment Fsw_f may be related to the bandwidth Bt of the target primary signal according to eq. (5) and (6) below.

$$Bw\_f=(1/20) \cdot Bt \sim (1/10) \cdot Bt \qquad \text{eq. (5)}$$

$$Fsw\_f=Bw\_f \qquad \text{eq. (6)}$$

In order to perform the channel power testing for the fine MRSS results (i.e., the discrete power values $p_{K,m}$ for each channel K listed in the vacant candidate channel index Iv), the average channel power $P_{CH,K}$ may be calculated by averaging the discrete power values $p_{K,m}$ for each channel K according to eq. (7), where M is the total number of fine scanned peaks per channel (block 954).

$$P_{CH,K} = \left(\frac{1}{M}\right) \sum_{m=1}^{M} p_{K,m} \qquad \text{eq. (7)}$$

This average channel power $P_{CH,K}$ for each channel K in the vacant candidate channel index Iv may be optionally converted to decibals (dB) (block 974), according to an example embodiment of the invention. In block 976, the average channel power $P_{CH,K}$ for each channel K may be compared with a threshold Pthrs, which may be the global noise reference N_global_db (provided by block 977) from the coarse scanning stage. If the average channel power $P_{CH,K}$ is smaller than the global noise reference N_global_db, then the corresponding channel may be transferred to the final decision stage and recorded as the vacant channel (block 986). Otherwise, the channel index may be added to the weak channel index, Iw, for the further investigation for the weak signal reception, as described in further detail with respect to block 950 and subsequent blocks.

B.2. Strong-Bin Channel Testing

Referring to FIGS. 8A-8D, in order to investigate the strong channel candidates, each channel spectrum listed in the strong candidate channel index Is may be scanned (block 902) with fine resolution MRSS parameters provided by block 904, as described with respect to in eq. (5) and (6) above. In order to perform the channel power testing for the fine MRSS results (i.e., the discrete power values $p_{K,m}$ for each channel K listed in the strong candidate index Is), the average channel power $P_{CH,K}$ may be calculated by averaging the discrete power values $p_{K,m}$ for each channel K according to eq. (7) (block 906).

This average channel power $P_{CH,K}$ for each channel in the strong candidate channel index "Is" may be optionally converted to decibals (dB) (block 908), according to an example embodiment of the invention. The average channel power $P_{CH,K}$, for each channel in the strong candidate index Is, may then be compared with a threshold Pthrs such as a strong mode threshold, TH_S, from the coarse scanning stage (block 910). If the average channel power $P_{CH,K}$ is larger than the strong mode threshold TH_S (block 910), the corresponding channel is transferred to the peak-count testing (block 914) for the further investigation for the strong signal reception. Otherwise, the channel index may be added to the weak channel index Iw for the further investigation for the weak signal reception (block 950).

When the strong channel power testing is passed in block 910, then in block 914, the discrete power values $p_{K,m}$ for each channel K listed in the strong candidate index Is may be compared to a given threshold value Pthrs obtained at least in part from block 912. According to an example embodiment of the invention, this threshold value Pthrs may be an average or median value $PM_K$, of the maximum and the minimum of the discrete power values $p_{K,m}$ for each channel K, as illustratively shown in FIG. 9. The number of peaks having the power value greater than this threshold value Pthrs may then be counted in blocks 916, 918. In particular, if a discrete power value $p_{K,m}$ is greater than the threshold value Pthrs in block 914, then the peak count may be incremented (block 918). Otherwise, the peak count remains the same and is not incremented (block 916). This peak count process described in blocks 914-918 may then be repeated with an interactive counter i being incremented (block 921) until the total number B_s of discrete power values $p_{K,m}$ for each channel K have been examined (block 920). The resulting final peak-count for each channel K may then be compared with a given peak-count threshold value, $N_{peak\_}S$ in block 922. When the peak-count is greater than the $N_{peak\_}S$ (block 922), this channel passes the peak-count testing as well. In this situation, the corresponding channel index may be transferred to the final decision stage and recorded as the strong signal reception channel (block 982). On the other hand, if this channel K does not pass the peak-count testing (block 922), this channel index is added to the weak channel index, Iw, for the further investigation for the weak signal reception (block 950). According to an example embodiment of the invention, this strong channel testing may prevent the potential false-alarm for the alias due to the adjacent strong signal spectrum.

B.3. Weak-Bin Channel Testing

Still referring to FIGS. 8A-8D, the weak candidate channel index list Iw may include three parts: the channel index numbers (i) categorized as the weak candidate channel in the coarse scanning stage, (ii) transferred from the vacant channel testing by failing the channel power test (block 976), and (iii) transferred from the strong channel testing by failing the channel power test or the peak-count testing (block 922). In order to investigate these weak channel candidates, each channel spectrum, listed in the candidate channel index Iw, is scanned with fine resolution MRSS parameters provided by block 953, as similarly described with respect to eq. (5) and (6) (block 952).

In order to perform the channel power testing for the fine MRSS results (i.e., the discrete power values $p_{K,m}$ for each channel K in the weak candidate channel index Iw), the average channel power, $P_{CH,K}$, is calculated by averaging the discrete power values $p_{K,m}$ for each channel according to eq. (7). This average channel power $P_{CH,K}$, for each channel K in the weak candidate channel index Iw may be optionally converted to decibals (dB) (block 956), according to an example embodiment of the invention. In block 958, the average channel power $P_{CH,K}$ for each channel K may be compared with a threshold Pthrs, which may be a weak mode threshold, TH_W (provided by block 960), from the coarse scanning stage. If the average channel power $P_{CH,K}$ is larger than the weak mode threshold TH_W (block 958), then the corresponding channel K may be transferred to the peak-count testing (block 960) for the further investigation for the weak signal reception. Otherwise, this channel index number is transferred to the final decision stage and recorded as the vacant channel (block 986). According to an example embodiment of the invention, this weak channel testing may prevent the potential false-alarm due to the alias from the adjacent strong signal spectrum or due to the channel power estimation from the coarse resolution scanning.

When the weak channel power testing is passed in block 958, then in block 960, the discrete power values $p_{K,m}$ values for each channel K listed in the weak candidate index Iw may be compared to a given threshold value Pthrs obtained at least in part from block 960. According to an example embodiment of the invention, this threshold value Pthrs may be an average or median value $PM_K$ of the maximum and the minimum of the discrete power values $p_{K,m}$ for each channel K, as illustratively shown in FIG. 9. The number of peaks having the power value greater than this threshold value Pthrs may then be counted in blocks 962, 964. In particular, if a discrete power value $p_{K,m}$ is greater than the threshold value Pthrs in block 960, then the peak count may be incremented (block 964). Otherwise, the peak count remains the same and is not incremented (block 962). This peak count process described in blocks 960-964 may then be repeated with an interactive counter i being incremented (block 967) until the total number B_w of discrete power values $p_{K,m}$ for each channel K have been examined (block 966). The resulting final peak-count for each channel K may then be compared with a given peak-count threshold value, $N_{peak\_}w$. When the peak-count is greater than the $N_{peak\_}w$ (block 968), this channel passes the peak-count testing as well. In this situation, the corresponding channel index is transferred to the final decision stage and recorded as the weak signal reception channel (block 984). On the other hand, if this channel K does not pass the peak-count testing (block 968), this channel index is transferred to the final decision stage and recorded as the vacant channel (block 986).

It will be appreciated that in order to decrease the effect of noise to the $p_{K,m}$ values, the averaging process is applied to the fine scanning stages in block 902, 952, 970. Accordingly, the fine MRSS scanning in blocks 902, 952, 970 may be repeated by N_s, N_w, or N_v times, for strong, weak and vacant channel cases, respectively. The signal spectrum in the strong candidate channel list may have relatively larger signal-to-noise (SNR) ratio compared to the signal spectrum in the vacant or weak candidate channel list. Thus, according an an example embodiment of the invention, a smaller value of N_s may be enough compared to the N_w or N_v. By selecting various combinations of N_s, N_w and N_v, the spectrum-sensing time consumed for the fine scanning stage may be optimized to save the overall spectrum-sensing time.

C. Final Decision Stage

According to an example embodiment of the invention, the channel lists passed the strong- and weak-channel testing (blocks 982 and 984) may be merged to provide the final list of the occupied channels (e.g., actually occupied channels) (block 988). The occupied channel list (block 988) may then be reported to medium access control (MAC) unit (block 990) to avoid the interference to the primary spectrum users as well as the CR users. Likewise, the vacant channel lists from the vacant- and weak-channel testing results may be merged to provide the final list of the vacant channels (e.g., actually vacant channels) (block 986). The corresponding channel list (block 986) may be reported to medium access control unit to assign these channels for use as a potential CR link.

Many modifications and other embodiments of the inventions set forth herein will come to mind to one skilled in the art to which these inventions pertain having the benefit of the teachings presented in the foregoing descriptions and the associated drawings Therefore, it is to be understood that the inventions are not to be limited to the specific embodiments disclosed and that modifications and other embodiments are intended to be included within the scope of the appended claims Although specific terms are employed herein, they are used in a generic and descriptive sense only and not for purposes of limitation.

The invention claimed is:

1. A spectrum-sensing method, comprising:
receiving an input spectrum having a plurality of channels;
performing a coarse scan of the plurality of channels of the input spectrum to determine one or more occupied candidate channels and vacant candidate channels, wherein the coarse scan is associated with a first resolution bandwidth and a first frequency sweep increment;
performing a fine scan of the occupied candidate channels and the vacant candidate channels to determine actually occupied channels and actually vacant channels, wherein the fine scan is associated with a second resolution bandwidth and a second frequency sweep increment; and
storing an indication of the actually occupied channels and the actually vacant channels.

2. The method of claim 1, wherein the first resolution bandwidth is larger than the second resolution bandwidth, and wherein the first frequency sweep increment is larger than the second frequency sweep increment.

3. The method of claim 1, wherein the first resolution bandwidth is equal to or larger than about half of a channel bandwidth to be coarse scanned, and wherein the first frequency sweep increment is equal to or larger than a channel bandwidth to be coarse scanned.

4. The method of claim 1, wherein the second resolution bandwidth is equal to or smaller than about half of a channel bandwidth to be fine scanned, and wherein the second frequency sweep increment is equal to or smaller than about half of the channel bandwidth to be fine scanned.

5. The method of claim 1, wherein performing the coarse scan includes estimating a coarse channel power for each channel of the plurality of channels based upon the first resolution bandwidth and the first frequency sweep increment.

6. The method of claim 5, wherein performing the coarse scan includes averaging a number of estimated coarse channel powers for each channel to generate an average channel power value for each channel.

7. The method of claim 6, wherein performing the coarse scan includes comparing the average channel power value for each channel to a first threshold and a second threshold to determine the occupied candidate channels and the vacant candidate channels.

8. The method of claim 1, wherein performing the fine scan includes determining a discrete power value for one or more fine-scanned peaks of a spectrum corresponding to the respective occupied candidate channel or vacant candidate channel.

9. The method of claim 8, wherein the discrete power value for one or more fine-scanned peaks is averaged according to a number of fine-scanned peaks to generate an average fine channel power corresponding to the respective occupied candidate channel or vacant candidate channel.

10. The method of claim 9, wherein the average fine channel power for a vacant candidate channel is compared with a noise reference level to determine that the vacant candidate channel is an actually vacant channel.

11. The method of claim 9, wherein the average fine channel power for an occupied candidate channel is compared with a first threshold level to determine, at least in part, an actually occupied channel.

12. The method of claim 11, wherein if the average fine channel power for the occupied candidate channel satisfies the first threshold level, then the fine-scanned peaks in the occupied candidate channel that satisfy a second threshold level are counted to determine the actually occupied channel.

13. A spectrum-sensing method, comprising:
providing an input radio frequency (RF) spectrum having a plurality of channels;
analyzing the plurality of channels of the input RF spectrum using a coarse-scanning stage to determine one or more strong candidate channels, weak candidate channels, and vacant candidate channels, wherein the coarse-scanning stage is associated with a first resolution bandwidth and a first frequency sweep increment;
analyzing the one or more strong candidate channels, weak candidate channels, and vacant candidate channels using a fine-scanning stage to determine actually occupied channels and actually vacant channels, wherein the fine-scanning stage is associated with a second resolution bandwidth and a second frequency sweep increment; and
storing an indication of the actually occupied channels and the actually vacant channels.

14. The spectrum-sensing method of claim 13, wherein the first resolution bandwidth is larger than the second resolution bandwidth, and wherein the first frequency sweep increment is larger than the second frequency sweep increment.

15. The spectrum-sensing method of claim 13, wherein the coarse-scanning stage includes estimating a coarse channel power for each channel of the plurality of channels of the input RF spectrum based upon the first resolution bandwidth and the first frequency sweep increment.

16. The spectrum-sensing method of claim 15, wherein the estimated coarse channel power for each channel is compared to dual-mode thresholds comprising a first threshold and a second threshold.

17. The spectrum-sensing method of claim 16, wherein:
if the estimated coarse channel power for a channel exceeds the first threshold, then the respective channel is determined to be a strong candidate channel,
if the estimated coarse channel power for a channel is below the second threshold, then the respective channel is determined to be a vacant candidate channel, and
if the estimated coarse channel power for a channel is between the first threshold and the second threshold, then the respective channel is determined to be a weak candidate channel.

18. The spectrum-sensing method of claim 13, wherein the fine-scanning stage includes estimating a fine channel power for each of the one or more strong candidate channels, weak candidate channels, and vacant candidate channels based upon the second resolution bandwidth and the second frequency sweep increment.

19. The spectrum-sensing method of claim 18, wherein for a strong or weak candidate signal analyzed by the fine-scanning stage, the fine channel power of the respective strong or weak candidate signal and a number of peaks associated with a spectrum of the respective strong or weak candidate signal are evaluated to determine an actually occupied channel or an actually vacant channel.

20. The spectrum-sensing method of claim 18, wherein the fine-scanning stage includes a strong-bin candidate test for strong candidate channels, a weak-bin candidate test for weak candidate channels, and a vacant-bin candidate test for vacant candidate channels, wherein if a strong candidate channel is not determined by the strong-bin candidate test to be an actually occupied signal, the strong candidate channel is further subject to the weak-bin candidate test, and wherein if a vacant candidate channel is not determined by the vacant-bin candidate test to be an actually vacant signal, the vacant candidate channel is further subject to the weak-bin candidate test.

21. The method of claim 1, wherein the prior steps are performed by a cognitive radio (CR) system.

22. The spectrum-sensing method of claim 13, wherein the prior steps are performed by a cognitive radio (CR) system.

* * * * *